(12) United States Patent
Rodriquez et al.

(10) Patent No.: US 7,543,223 B2
(45) Date of Patent: Jun. 2, 2009

(54) ACCESSIBILITY TO WEB IMAGES THROUGH MULTIPLE IMAGE RESOLUTIONS

(75) Inventors: Herman Rodriquez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1819 days.

(21) Appl. No.: 09/838,365

(22) Filed: Apr. 19, 2001

(65) Prior Publication Data

US 2002/0154146 A1    Oct. 24, 2002

(51) Int. Cl.
*G06N 3/00*    (2006.01)
(52) U.S. Cl. .................................................. 715/200
(58) Field of Classification Search .............. 715/513, 715/501, 517, 530, 200, 234, 243, 254, 255; 345/428, 667
See application file for complete search history.

(56) References Cited

U.S. PATENT DOCUMENTS

| | | | | |
|---|---|---|---|---|
| 5,696,845 | A * | 12/1997 | Loce et al. | 382/254 |
| 5,946,527 | A * | 8/1999 | Salgado et al. | 399/82 |
| 6,708,309 | B1 * | 3/2004 | Blumberg | 715/530 |
| 2002/0000998 | A1 * | 1/2002 | Scott et al. | 345/667 |
| 2002/0018072 | A1 * | 2/2002 | Chui | 345/667 |

FOREIGN PATENT DOCUMENTS

| | | |
|---|---|---|
| JP | 2000-198248 | 7/2000 |
| JP | 2000-339244 | 12/2000 |
| JP | 2002-108323 | 4/2002 |

OTHER PUBLICATIONS

Prabhakar et al, "Browsing and Placement of Multiresolution Images on Parallel Disks", 1997, pp. 102-113.
Meyer et al., "Computer Networks and ISDN Systems", The International Journal of Computer and Telecommunications Networking, vol. 28, Nos. 7-11, May 1996, pp. 1123-1137.
Liepins, et al., "A Browser Based Image Bank, Useful Tool or Expensive Toy?", Medical Informatics, vol. 23, No. 3, 1998, pp. 177, 199-206.
"New Integrated WWW Microsoft Browser, Internet Explorer 4.0", ASCII, vol. 21 (12), pp. 354-357.
"Enjoy Netsurfing in New Year!", Oh! PC, Soft Bank Corp., vol. 15 (15), pp. 210-213.

* cited by examiner

*Primary Examiner*—Stephen S Hong
*Assistant Examiner*—Kyle Stork
(74) *Attorney, Agent, or Firm*—Yee & Associates, P.C.; Matthew W. Baca

(57) ABSTRACT

A method, program and apparatus for providing access to alternate images in an electronic document are provided. The present invention comprises identifying an initial image to be displayed in an electronic document (typically a web page) and then determining if alternate versions of the image are available for display. If alternate versions of the image are available, they are provided within the same electronic document. The alternate images differ from the initial image in size and resolution, allowing users with visual impairments to access larger, higher resolution images. The user accesses the alternate images by means of a selector displayed within the electronic document. When selected, the alternate image replaces the initial image in the electronic document, and the document is reformatted.

1 Claim, 4 Drawing Sheets

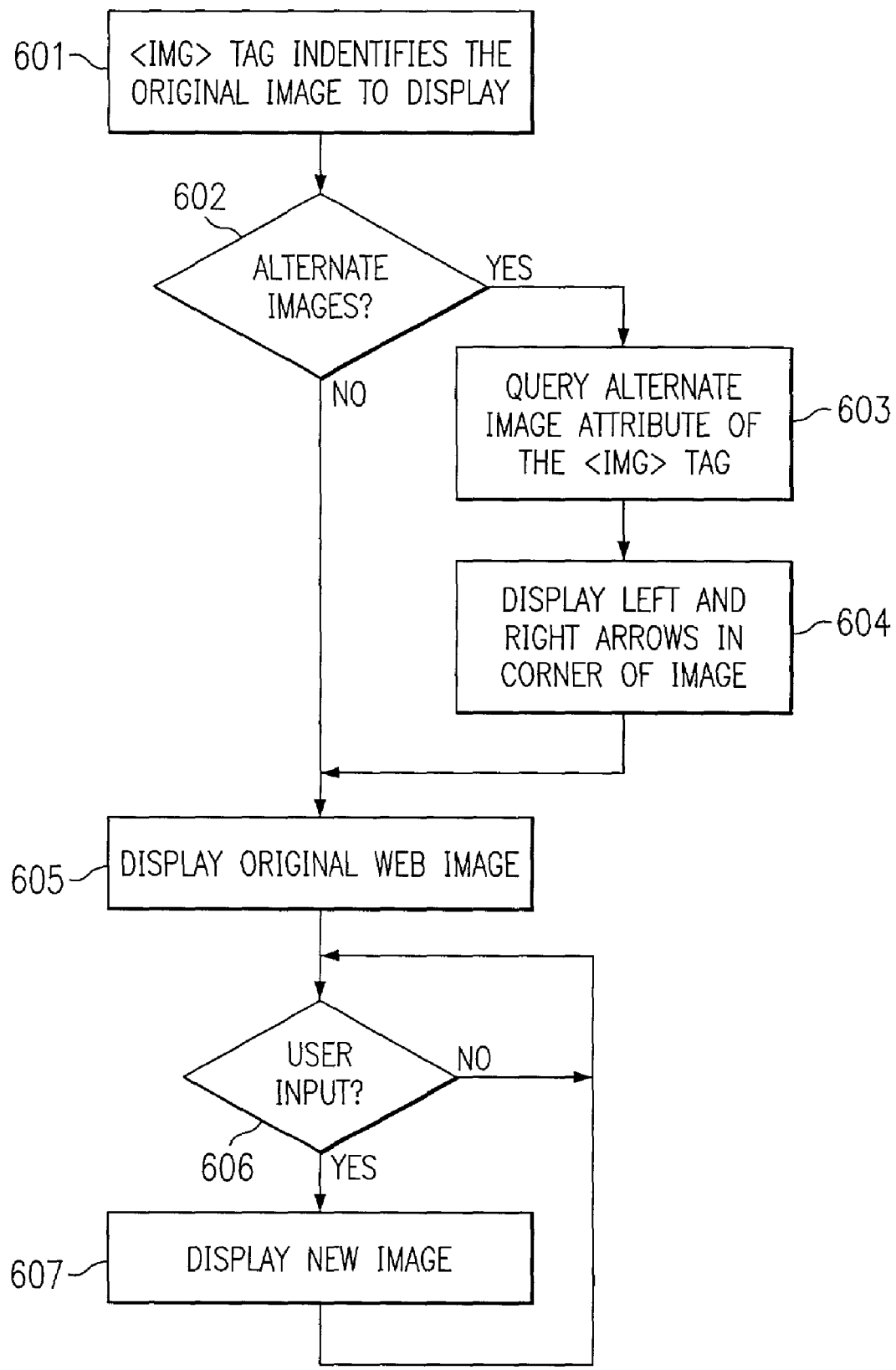

ACCESSIBILITY TO WEB IMAGES THROUGH MULTIPLE IMAGE RESOLUTIONS

BACKGROUND OF THE INVENTION

1. Technical Field

The present invention relates to computer network environments. More specifically, the present invention relates to accessing electronic documents.

2. Description of Related Art

Information on the World Wide Web is typically made available by structuring the information into a visual presentation. Hypertext Markup Language (HTML) is used by the web author to define the visual structure. The end user is presented with this information by viewing the information on a computer display, after the information has been rendered into a visual format by a web browser (e.g. Netscape Navigator or Microsoft Internet Explorer).

However, the images displayed by conventional web browsers may not be clear enough for users with visual impairments. Though web users with visual impairments can set a web browser to default to a larger font for readability, it is often desirable for this impaired user to see a larger, more detailed version of an image. Currently, there is no way for the user to know if there is a higher resolution image available on the same web page. With today's web pages, the user must access an alternate version of the image via a link to an alternate web page, or an alternate image file. Current web browsers may allow the user to magnify portions of a web page (including images), but this magnification does not adjust picture resolution, resulting in a grainy image.

Therefore, it would be desirable to have a method for directly accessing alternate sizes of an image, with corresponding adjustments in resolution to maintain sharp picture quality.

SUMMARY OF THE INVENTION

The present invention provides a method, program and apparatus for providing access to alternate images in an electronic document. The present invention comprises identifying an initial image to be displayed in an electronic document (typically a web page) and then determining if alternate versions of the image are available for display. If alternate versions of the image are available, they are provided within the same electronic document. The alternate images differ from the initial image in size and resolution, allowing users with visual impairments to access larger, higher resolution images. The user accesses the alternate images by means of a selector displayed within the electronic document. When selected, the alternate image replaces the initial image in the electronic document, and the document is reformatted.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts a flowchart illustrating the process of presenting alternate image resolutions in accordance with the present invention.

DETAILED DESCRIPTION OF THE PREFERRED EMBODIMENT

Figure 1:
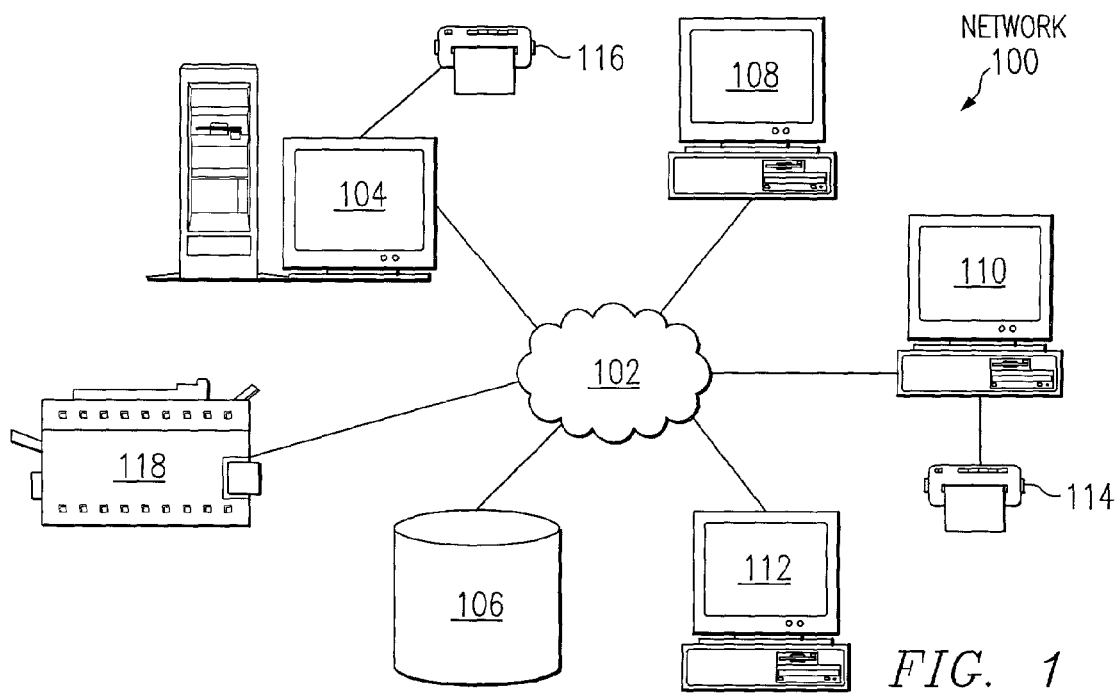
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links among various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108, 110, and 112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with each other. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
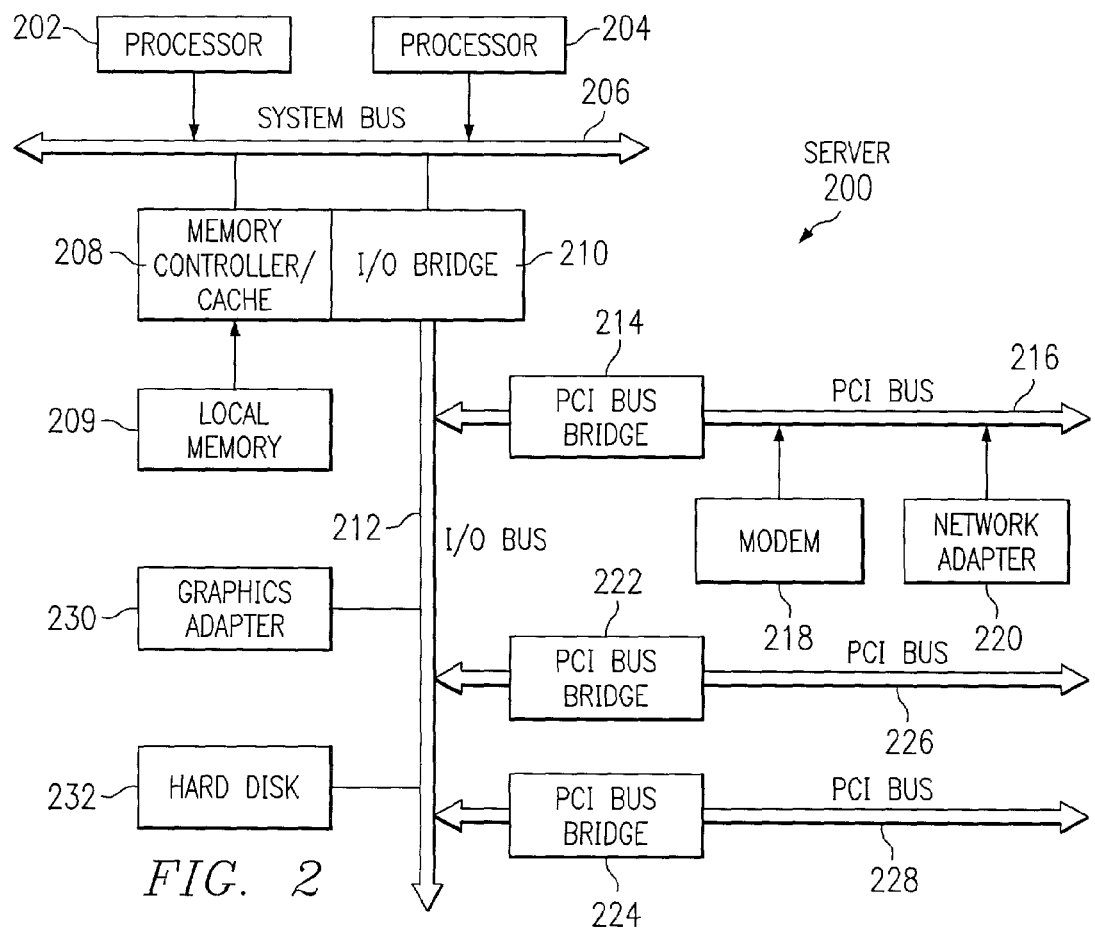
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral Component Interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108, 110, and 112 in FIG. 1 may be provided through modem 218 and/or network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
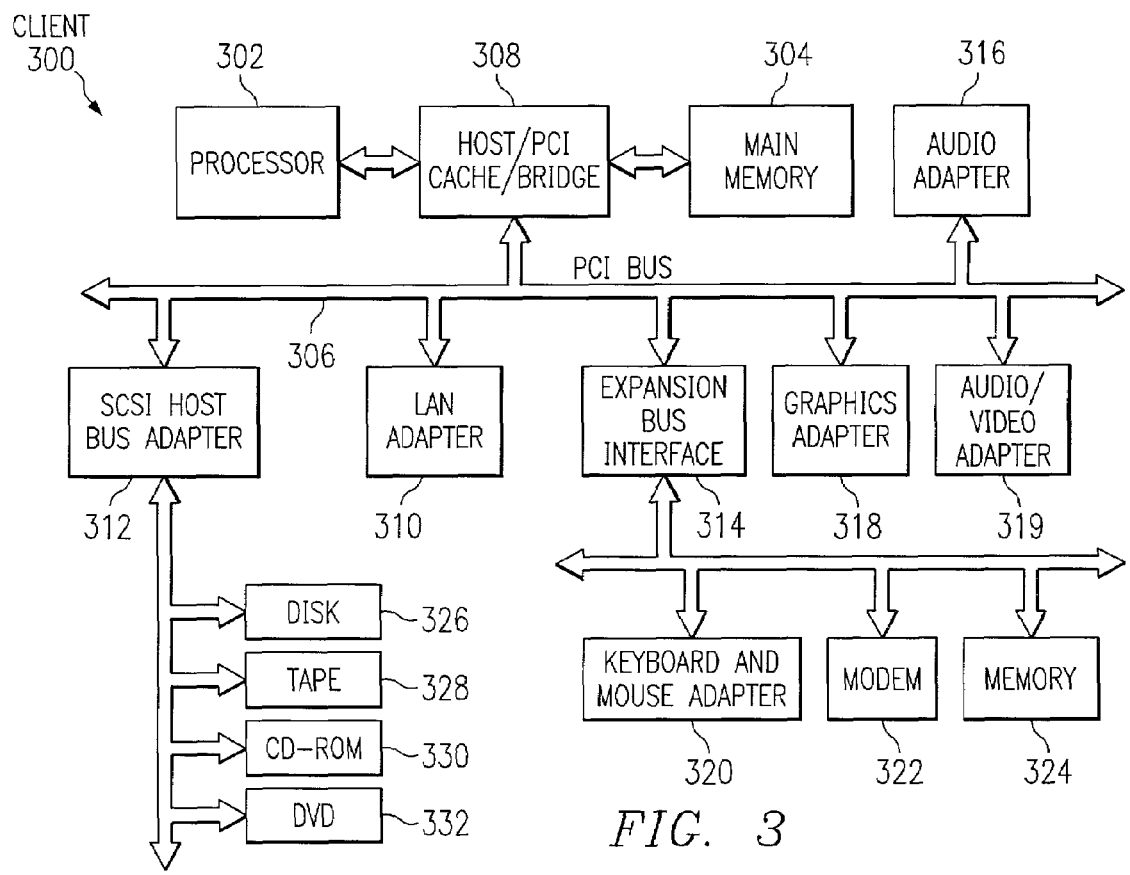
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, SCSI host bus adapter 312, and expansion bus interface 314 are connected to PCI local bus 306 by direct component connection. In contrast, local area network (LAN) adapter 310, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, CD-ROM drive 330, and DVD drive 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object-oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
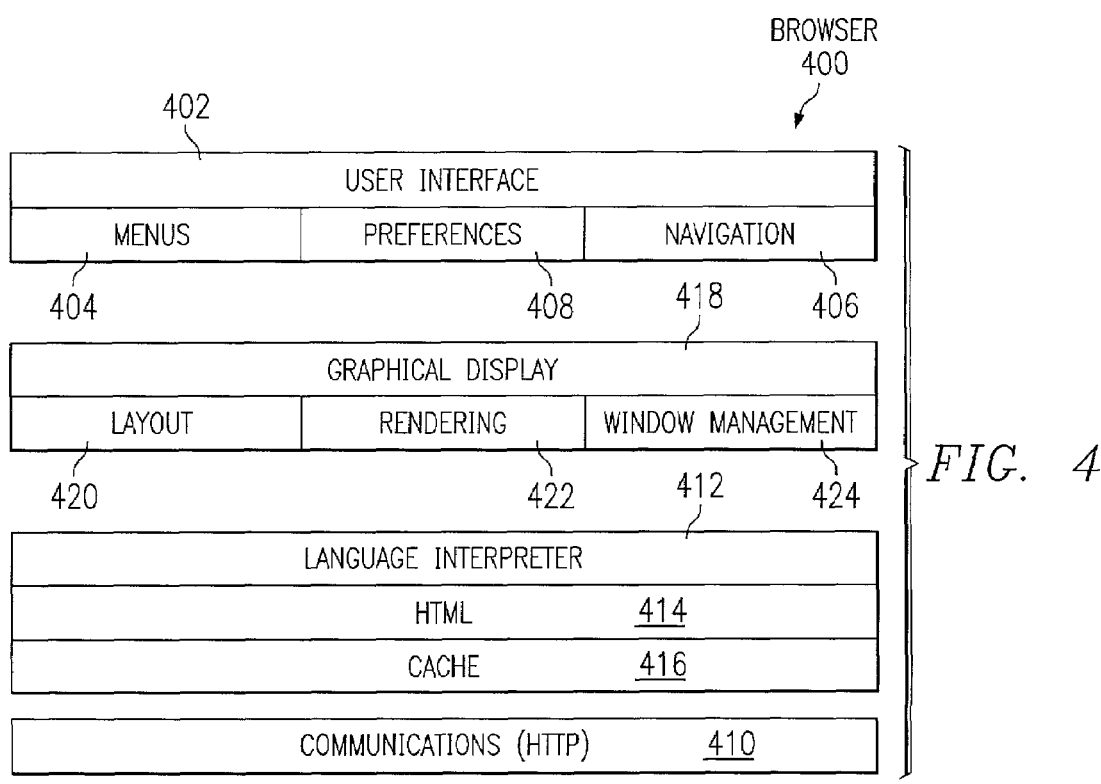
FIG. 4 depicts a block diagram of a browser program in accordance with a preferred embodiment of the present invention.

Turning next to FIG. 4, a block diagram of a browser program is depicted in accordance with a preferred embodiment of the present invention. Browser 400 includes a user interface 402, which is a graphical user interface (GUI) that allows the user to interface or communicate with browser 400. This interface provides for selection of various functions through menus 404 and allows for navigation through the navigation button 406 or selections. For example, menu 404 may allow a user to perform various functions, such as saving a file, opening a new window, displaying a history, and entering a URL. Navigation 406 allows for a user to navigate various pages and to select web sites or documents for viewing. For example, navigation 406 may allow a user to see a previous page or a subsequent page relative to the present page. User preferences may be set through preferences 408.

Communications 410 is the mechanism with which browser 400 receives documents and other resources from a network such as the Internet. Further, communications 410 is used to send or upload documents and resources onto a network. In the depicted example, communication 410 uses HTTP. However, other protocols are possible. Documents that are received by browser 400 are processed by language interpreter 412, which includes an HTML unit 414. Language interpreter 412 will process a document for presentation on graphical display 418. In particular, HTML statements are processed by HTML unit 414 for presentation. Browser 400 also includes cache memory 416.

Graphical display 418 includes layout unit 420, rendering unit 422, and window management unit 424. These units are involved in presenting web pages to a user based on results from language interpretation 412.

Browser 400 is presented as an example of a browser program in which the present invention may be embodied. Browser 400 is not meant to imply architectural limitations to the present invention. Presently available browsers may include additional functions not shown herein or may omit functions shown in browser 400. As used herein, the term "browser" encompasses any software application used to view or navigate for information or data (i.e. something that assists a user to browse) in a local or distributed data base where the distributed database is typically the Internet or World Wide Web.

It should also be noted that the present invention may also be applied to word processing and desktop publishing applications, as well as any other applications which involve placing images within electronic documents.

The present invention provides a method to make web images more accessible to people who are vision impaired (or want to view a more detailed image) by providing access to multiple-sized versions of an image on a web page. The multiple images are accessed from the web and displayed at the location of the original image when the person desires to see a larger image. This is accomplished without accessing a new web address or changing the rest of the web page's content. Unlike prior art approaches which simply magnify an image without adjusting picture resolution, the present invention allows the user to view a larger image with the proper adjustment in resolution needed to maintain a sharp picture quality. The new image is displayed, along with reflowing of the web page.

The present invention requires an addition to the HTML/XML standards to allows an ALT attribute for the <IMG> tag which can specify multiple images.

Figure 5:
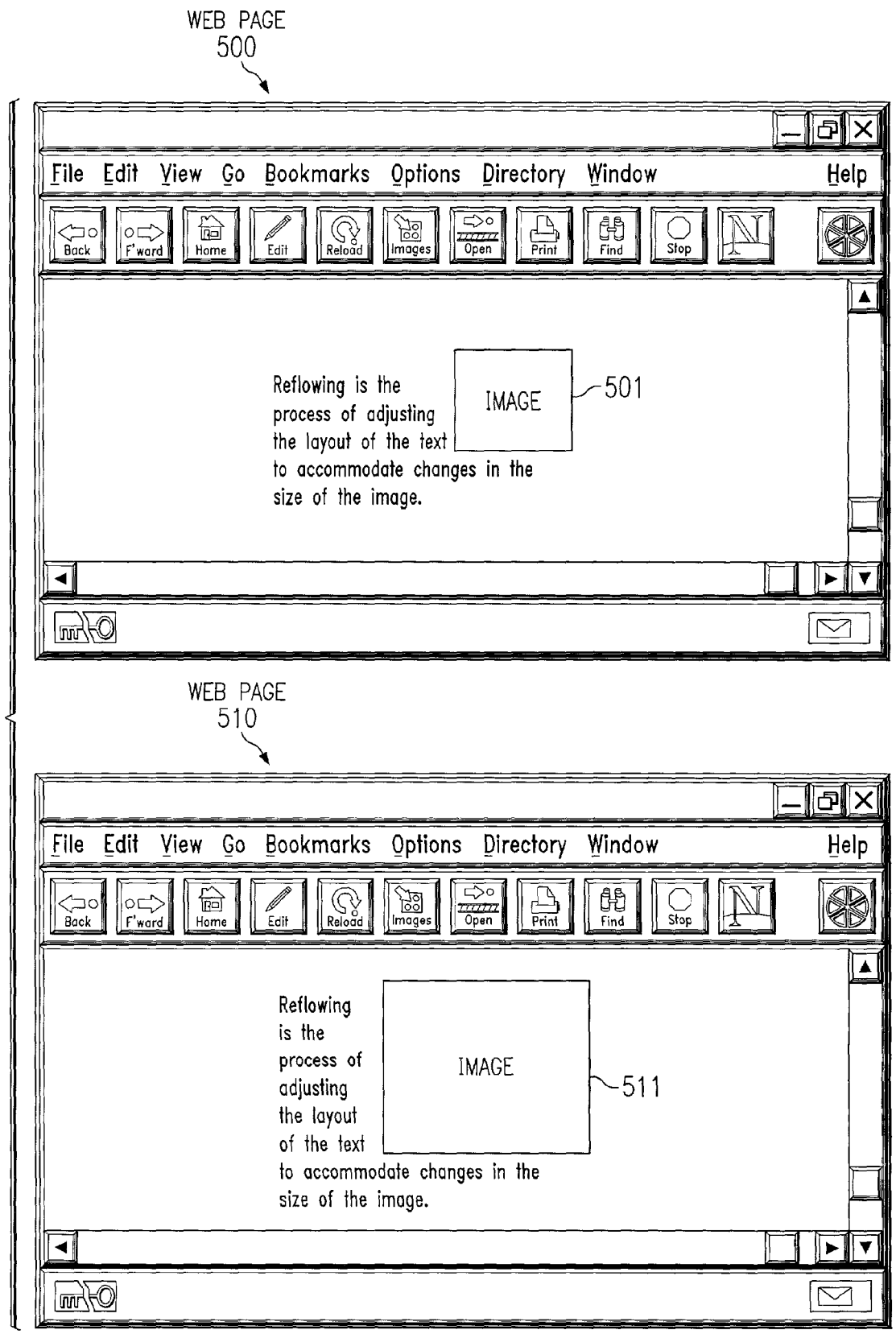
FIG. 5 depicts a pictorial diagram illustrating reflowing of the text on a web page in accordance with the present invention.

Referring to FIG. 5, a pictorial diagram illustrating reflowing of the object text on a web page is depicted in accordance with the present invention. Flow is the manner in which text on a web page is arranged in order to accommodate an image or other object rendered by the browser. Reflowing involves adjusting the text layout to accommodate changes in the size of the image. In FIG. 5, web pages 500 and 510 illustrate the reflowing of text required to accommodate the transition from the smaller image 501 to a larger image 511.

This process can be repeated for several sizes of images, until the user reaches the size of image that he finds most readable. When the user is finished viewing the image, he can then reverse the process and bring back the smaller images, again providing more page/screen space for text and other objects.

The present invention provides several advantages:

The present invention solves the problem of having to go to a new web page, when the user needs to see a larger, more detailed image.

Additional versions of the image may be transmitted while the user is viewing the first image, thereby minimizing perceived transmission time and web URL access time.

Once a different size image is downloaded, it is cached along with the web page, allowing for quick changes among the different sizes of images.

In addition, the present invention is useful for easily implementing the common web application of a web page with a thumbnail picture, which then links to a full-size picture page (often referred to as a web photo album). With this thumbnail approach, a separate page is not needed for the alternate image sizes. As stated above, the browser may continue to download the larger sized images into memory while the user is viewing the first image version, which reduces the user's perceived wait time. In another embodiment, the alternate images may be stored on a server, rather than in cache memory.

A user may also customize the browser. For example, the desired resolution of alternate images can be specified according to the client computer's connection speed. If the connection speed is slow, the user may wish to sacrifice some image resolution for the sake of faster download. In addition, the user may preset the accessibility indicators of the browser, such as the default size of indicator arrows. Without this option, a user with severe visual or motor impairments may not even be able to effectively use the browser to access a larger image. By presetting the browser to automatically display larger indicator controls, this impaired user may more easily navigate a web page and access alternate images.

As a further option, the user may preset the browser to automatically display a certain image size as the default image. For example, rather than always starting from a small original image and working up in sizes, the user may wish to set the browser to display an intermediate size image.

Referring to FIG. 6, a flowchart illustrating the process of presenting alternate image resolutions is depicted in accordance with the present invention. The <IMG> HTML tag uses the source (SRC) attribute to identify the initial original image to display as the web page is first rendered (step 601). If the web page contains alternate images for display, the HTML image tag has an alternate image attribute, such as ALTIMAGE, which specifies alternate image files.

The browser determines if the image has alternate images for display (step 602). If there are no alternate images available, the browser simply displays the original image (step 605). If the web page does contain alternate images, the browser queries the ALTIMAGE attribute of the <IMG> tag specifying the alternative image files (step 603). This alternate image attribute would be similar to the ALT attribute, which provides alternate text for an image. However, the ALTIMAGE attribute can be used multiple times to allow for several alternate larger, higher resolution images. The web browser overlays a lower corner of the image with small right and left arrows (step 604), and then displays the original image (step 605).

If the user clicks on the right arrow (step 606), the alternate larger image is accessed by the web browser and displayed on the page (step 607). If the new image has another larger alternate image, the browser also displays a right arrow in its corner. In addition, the browser displays a left arrow in the corner whenever it can bring the user back to a previous alternate image or the original image. In this way, the user can choose to go on to another larger image, if available, or back to a previous image.

The design of the present invention can be implemented with the display of the arrows being a web browser view option. If the user chooses not to have the browser display the arrows in the corner of the image, the user could still cycle through the alternate images by clicking on the image itself.

The present invention can also be implemented by the use of custom plug-ins or special Java applets. However, both of these methods would require special tools, would be slower in download and web page display, and would require additional work by the web page developer to implement the web page.

It is important to note that while the present invention has been described in the context of a fully functioning data processing system, those of ordinary skill in the art will appreciate that the processes of the present invention are capable of being distributed in the form of a computer readable medium of instructions in a variety of forms, and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing alternate images in an electronic document, comprising:

identifying an initial image to be displayed in an electronic document;

explicitly providing references to alternate images of the initial image within the same electronic document, wherein the alternate images differ from the initial image in size and resolution, and wherein the alternate images are different-sized versions of the initial image;

displaying the initial image;

providing a selector for accessing the alternate images; and responsive to receiving user selection input, replacing the initial image with an alternate image and reformatting the electronic document, wherein reformatting the electronic document comprises reflowing text around the alternate image in the electronic document to accommodate changes in image size.

* * * * *